UNITED STATES PATENT OFFICE.

HENRY A. HARRIS, OF NEWARK, NEW JERSEY, ASSIGNOR TO NEW ERA REMOVER COMPANY, OF NEWARK, NEW JERSEY, A CORPORATION OF NEW JERSEY.

FINISH-REMOVER.

1,145,365.   Specification of Letters Patent.   Patented July 6, 1915.

No Drawing.   Application filed March 23, 1915.   Serial No. 16,466.

*To all whom it may concern:*

Be it known that I, HENRY A. HARRIS, a citizen of the United States, residing in the city of Newark, county of Essex, and State of New Jersey, have invented new and useful Improvements in Finish-Removers, of which the following is a specification.

This invention relates to a waxy, volatile solvent finish remover containing both volatile and non-volatile finish solvent with waxy bodies emulsified therewith.

It has for its objects the production of a finish remover without the employment of common explosive hydrocarbon solvents heretofore employed in order to act as a solvent for the wax, and furthermore to distribute the wax in a deflocculated state of emulsion throughout the remover, as well as to produce a remover which is extremely reactive toward paint or varnish coatings, and yet it is without objectionable action either upon the human cuticle or fine woods with which it comes in contact.

It has been proposed heretofore in the production of paint and varnish removers to employ sufficient wax in a state of suspension to substantially thicken the same so as to form a jelly-like mass, whereby evaporation was to a greater or less extent retarded depending upon the nature of the waxy bodies employed and the character of the liquid ingredients of the mixture, as the greater the content of non-volatile liquid ingredients the slower will be the evaporation of the volatile ingredients from the mixture. In the preparation of these mixtures, it has been proposed to first dissolve the wax in benzol or similar solvent of wax, substantially 34% being the amount of wax indicated, then precipitate such wax from the aforesaid solution while warm with an alcoholic body. Generally no other compound was added, and the resultant product was a thick, jelly-like mass.

My investigations have led to the discovery that a so-called wax solvent can be entirely dispensed with and an efficient and entirely satisfactory remover can be produced by the employment of certain waxes which have the property of being de-flocculated (*i. e.* finely distributed in an emulsion-like state), by both volatile and non-volatile finish solvents which are not solvents of wax, such as various alcohols, the phenols which correspond to tertiary alcohols, ketones, and organic acids, for example acetone or mixtures thereof, also formic acid and other equivalents as substituted therefor in the aforesaid paint and varnish remover.

The following formula produces a very excellent remover of this type: carbolic acid crystals or crude carbolic acid (95% phenols), 10%; candelilla wax, 2%; paraffin wax, 1%; acetone, or alcohol, 87%.

Another example of a formula for a heavy remover may be prepared as follows:— for a 525 gallon batch: crude carbolic acid, 43 gals.; paraffin wax, 24 lbs.; candelilla wax, 72 lbs.; acetone, or alcohol, 476 gals.

Preferably the waxes are first melted by heat at about 130° F. and the melt is then poured into hot carbolic acid, either crystals or crude, heated to a temperature preferably of 140° F. To this mixture is then added about half of the acetone, and the same is then heated to about 140° F. which is almost but not quite the boiling point of the mixture, then the same is cooled by adding the balance of the acetone in a cold condition. During the process of manufacture, and until the mixture is complete, the same is continuously stirred. Preferably also a steam jacketed mixing kettle having a substantially air tight cover is employed for the manufacture of the mixture, owing to the volatility of the acetone when raised to or near its boiling point.

A remover made in accordance with my invention as herein described is very efficient upon paint or varnish surfaces, in fact it cuts or softens the finish very rapidly and remains wet from ten to twenty-four hours depending upon the nature of the surfaces to which it is applied. A very important feature moreover of this remover is that it is wholly non-explosive, being free from the explosive wax solvent benzol or equivalent explosive hydrocarbon solvents of wax, and also it has a relatively high flashing point, in fact almost double that of the removers at present upon the market, and in this latter respect corresponds very closely with kerosene. This remover when applied to painted or varnished surfaces soon softens the same into a non-gummy sludge which can be readily removed as with knife or cloth, and the surface can then be washed with water, it being entirely unnecessary, even though the same are suitable with this remover, to employ the expensive and explosive washes, as benzol or gasolene now commonly required for this purpose. This is due to the fact that not only is my remover free from benzol which is non-miscible with water, but it contains only a minor percentage of oily or greasy waxes such as paraffin, as the candelilla wax is distinctly non-greasy.

It is obvious that the absence of benzol from the remover and also the elimination of the necessity of using benzol or gasolene as a wash for the surfaces to which the remover is applied, are extremely important from a practical standpoint. In fact such remover has long been desired, but heretofore it has been impossible to obtain an efficient remover of this type free of a wax solvent in which the waxes would remain in substantially permanent emulsion without the appreciable settling thereof. Moreover, even when methyl alcohol, which as is known evolves deleterious fumes, is used in my remover, the emulsified waxes and carbolic acid serve to effectively retard and modify the vapors so that they become comparatively harmless to the sensorial system of the workmen. At the same time the vapors are non-explosive and have, as stated, a high flashing point, owing to the fact that a comparatively insignificant amount of the modified vapors are permitted to escape from the remover upon exposure of the same to atmospheric conditions.

A remover made in accordance with my invention moreover, owing to the absence of the penetrating hydrocarbon wax solvents such as benzol, may contain even in excess of 25 per cent. of the purest form of carbolic acid and still be free from serious corrosive action upon the human cuticle or any discoloring or grain-raising action upon the finest woods.

As a non-volatile carrier of the wax, I include in addition to the crude carbolic acid crystals or crude carbolic acid, which latter, as is well known, consists principally of the phenols known as cresols, with greater or less percentages of phenol proper, other similar bodies containing the "benzene ring" higher in the phenol series.

In lieu of the aforesaid carbolic acid as given in the preferred formula herein, I may for example employ a similar amount of formic or acetic acid, although these acids are more volatile than phenol, and for some purposes such a remover will not be as satisfactory as the first mentioned carbolic acid remover.

The alcoholic or ketonic or like finish solvents herein employed also serve as volatile carriers of the emulsified wax and both the aforesaid non-volatile carrier and the volatile carriers serve as waxy deflocculents or emulsifying agents. Also candelilla wax is preferred as the major wax although other vegetable waxes, capable of being deflocculated or emulsified by acetone or alcohol in the presence of carbolic acid so as to be suitable substitutes for candelilla wax, as the major wax, may be employed without departing from the spirit of my invention, such for example as palm wax and similar wax. By the use of paraffin wax only, it is not possible to obtain as satisfactory an emulsion whereby the evaporation of the remover will be sufficiently retarded to render the same efficient for the purpose intended. However, I have found that the wax ingredient can not only be considerably cheapened by the use of a minor percentage of paraffin wax incorporated with the vegetable wax, such as candelilla, but also the paraffin wax imparts the property to the candelilla wax or other vegetable wax of being almost perfectly emulsified by the phenolic or fatty acid or alcoholic or ketonic ingredients employed as carriers, as herein described.

The aforesaid finish remover requires the presence of a non-volatile alcoholic or phenolic wax-carrier or vehicle if it is desired to not only increase the cutting properties of the remover but to more effectively retard evaporation than is possible without the employment of these potent non-evaporants. While preferably but about 9% to 10% is employed owing to the expense incurred by using larger quantities, even in excess of 25% of pure carbolic acid, may be employed without deleterious results upon the wood, upon the subsequent coats of finish, or upon the human cuticle, but obviously unless very refractory work is met with, the substantial percentage of 9% to 10% is ample to impart all of the desirable qualities of phenol to my finish removers.

Under the term "active softening agent of paint or varnish films" as used in the claims, I include both the alcohols, ketones and the fatty acids such as formic, acetic and fatty acids higher in the series, capable of substitution therefor.

Even at high temperatures of 100° F. or low temperatures say 40° F. for example, there is no appreciable settling of the waxy ingredients of my removers and accordingly unlike other removers wherein there was a marked tendency of the wax to settle at summer temperatures and allow the escape of the volatile ingredients, in my removers such escape of the volatile injurious alcoholic vapors is almost entirely prevented with the consequent high flashing point being obtained.

Having thus described my invention, what I claim and desire to secure by Letters Patent is:

1. A finish remover comprising volatile and non-volatile wax de-flocculating agents which are energetic solvents of paint or varnish films, and a vegetable wax susceptible of de-flocculation thereby, said mixture being free from a wax solvent.

2. A finish remover consisting of an alcoholic body, a phenolic body, and a vegetable wax, the same being free from a wax solvent.

3. A finish remover consisting of non-explosive ingredients, containing a deflocculating agent including an alcoholic finish solvent and a vegetable wax in condition of substantially permanent emulsion therein, said remover being free from a wax solvent.

4. A finish remover, consisting only of non-explosive ingredients, containing an active softening agent of paint or varnish films, a vegetable wax and a mineral wax adapted to be emulsified thereby in a condition of permanent emulsion therewith, and a phenolic carrier miscible with said softening agent and adapted to retard evaporation thereof, said remover being free from a wax solvent.

5. A finish remover comprising a few per cent. of waxy ingredients including a vegetable wax, in excess of 9% of a phenolic body and an active softening agent of paint or varnish films, said remover having a relatively low flashing point, said remover being free from a wax solvent.

6. A finish remover comprising about one per cent. of paraffin wax, about two per cent. of candelilla wax, about 9 to 10% of a phenolic carrier for said wax, and in excess of 85% of an active softening and disintegrating agent of paint or varnish films, said remover being free from a hydrocarbon wax solvent.

7. A finish remover comprising wax capable of being emulsified by phenolic and alcoholic bodies in the absence of a wax solvent so as to form a substantially permanent emulsion therewith, in excess of $7\frac{1}{2}\%$ of a phenolic wax carrier, and an alcoholic softening and disintegrating agent of paint or varnish films in an amount in excess of 75 per cent. of the weight of the mixture, said remover being free from a wax solvent.

In witness whereof, I have hereunto set my hand at the city of New York, county of New York, and State of New York this 22nd day of March, 1915.

HENRY A. HARRIS.

Witnesses:
 JAMES A. HUGHES,
 W. H. SWENARTON.